(12) United States Patent
Roche et al.

(10) Patent No.: US 10,668,649 B2
(45) Date of Patent: Jun. 2, 2020

(54) METHOD AND APPARATUS FOR PRODUCTION OF CARBON FIBER COMPONENTS

(71) Applicant: Penso Holdings Ltd, Coventry (GB)

(72) Inventors: Dave Roche, Berkswell (GB); Daniel Hurcombe, Wolverhampton (GB); Jevon Thurston-Thorpe, Royal Leamington Spa (GB)

(73) Assignee: Penso Holdings Ltd, Coventry (GB)

( * ) Notice: Subject to any disclaimer, the term of this patent is extended or adjusted under 35 U.S.C. 154(b) by 148 days.

(21) Appl. No.: 15/073,266

(22) Filed: Mar. 17, 2016

(65) Prior Publication Data
US 2016/0271839 A1 Sep. 22, 2016

(30) Foreign Application Priority Data
Mar. 17, 2015 (GB) .................................. 1504498.5

(51) Int. Cl.
*B29C 35/16* (2006.01)
*B29C 70/30* (2006.01)
(Continued)

(52) U.S. Cl.
CPC .............. *B29C 35/16* (2013.01); *B29B 11/16* (2013.01); *B29C 31/008* (2013.01); *B29C 33/04* (2013.01);
(Continued)

(58) Field of Classification Search
CPC ................................ B29C 35/16; B29C 11/16
See application file for complete search history.

(56) References Cited

U.S. PATENT DOCUMENTS 4,164,523 A * 8/1979 Hanning ................. B29C 35/16
264/237
4,622,091 A * 11/1986 Letterman ............. B29B 15/105
156/286
(Continued)

FOREIGN PATENT DOCUMENTS

EP 0933182 A2 8/1999
JP H04193507 A 7/1992
(Continued)

OTHER PUBLICATIONS

European Search Report dated Sep. 12, 2016 for European Application No. 16161016.7.
(Continued)

*Primary Examiner* — Leith S Shafi
*Assistant Examiner* — Nicholas R Krasnow
(74) *Attorney, Agent, or Firm* — Honigman LLP

(57) ABSTRACT

A method of manufacture of a carbon fiber article comprises providing a preform mold having a region that is shaped to compliment a shape of a preform part that is to be produced the surface being provided with at least one bore or groove that is connected to at least one conduit that passes through the mold to a manifold, laying a sheet of release material onto the surface covering at least some of the plurality of holes, applying reduced pressure to the manifold to cause the sheet to be sucked down onto the mold surface, laying carbon fiber material into the mold on top of the sheet of release material, applying an increase pressure to the manifold to push the preform free from the mold surface, and removing the preform from the mold.

7 Claims, 3 Drawing Sheets

(51) Int. Cl.

| | |
|---|---|
| *B29C 33/46* | (2006.01) |
| *B29C 33/04* | (2006.01) |
| *B29C 70/44* | (2006.01) |
| *B29C 37/00* | (2006.01) |
| *B29B 11/16* | (2006.01) |
| *B29C 33/18* | (2006.01) |
| *B29C 31/00* | (2006.01) |
| *B29L 31/30* | (2006.01) |
| *B29L 31/00* | (2006.01) |

(52) U.S. Cl.
CPC ............... *B29C 33/18* (2013.01); *B29C 33/46* (2013.01); *B29C 37/0075* (2013.01); *B29C 70/30* (2013.01); *B29C 70/44* (2013.01); *B29C 2035/1616* (2013.01); *B29C 2791/006* (2013.01); *B29C 2791/007* (2013.01); *B29L 2031/3041* (2013.01); *B29L 2031/757* (2013.01)

(56) References Cited

U.S. PATENT DOCUMENTS

| | | | | |
|---|---|---|---|---|
| 4,883,631 A * | 11/1989 | Ajmera | ............... | B29C 49/6472 264/528 |
| 4,915,896 A * | 4/1990 | Rachal | ............... | B29C 35/04 264/102 |
| 4,944,669 A * | 7/1990 | Zakich | ............... | B29C 33/202 425/589 |
| 5,061,542 A * | 10/1991 | Brace | ............... | B29B 11/16 156/227 |
| 5,071,711 A * | 12/1991 | Heck | ............... | B29B 15/105 264/135 |
| 5,338,172 A * | 8/1994 | Williamson | ............... | B29C 35/16 264/237 |
| 5,451,157 A | 9/1995 | Gimenez | | |
| 5,521,229 A * | 5/1996 | Lu | ............... | C08F 2/16 522/40 |
| 5,620,715 A * | 4/1997 | Hart | ............... | B29C 51/22 264/237 |
| 5,628,938 A * | 5/1997 | Sangeeta | ............... | C04B 35/573 264/28 |
| 5,766,534 A * | 6/1998 | White | ............... | B29B 11/16 264/137 |
| 5,820,801 A * | 10/1998 | Greve | ............... | B29B 11/16 264/86 |
| 5,935,475 A * | 8/1999 | Scoles | ............... | B29C 66/0344 219/633 |
| 6,036,900 A * | 3/2000 | Munk | ............... | B29C 70/48 264/102 |
| 6,223,541 B1 * | 5/2001 | Farrag | ............... | B29C 35/16 425/526 |
| 6,406,659 B1 * | 6/2002 | Lang | ............... | B29C 33/0066 264/102 |
| 8,312,827 B1 * | 11/2012 | Free | ............... | B32B 5/06 112/475.08 |
| 8,650,745 B2 * | 2/2014 | Jacobsen | ............... | B29C 35/02 264/101 |
| 9,631,870 B2 * | 4/2017 | Anderson | ............... | F27D 19/00 |
| 9,669,570 B2 * | 6/2017 | Godon | ............... | B29C 45/0025 |
| 9,676,124 B2 * | 6/2017 | Lownsdale | ............... | B29C 70/12 |
| 2002/0146529 A1 * | 10/2002 | Lang | ............... | B29C 33/0066 428/36.9 |
| 2003/0111752 A1 * | 6/2003 | Wood | ............... | B29C 70/48 264/29.1 |
| 2003/0194597 A1 * | 10/2003 | Ganski | ............... | B29C 45/0013 429/434 |
| 2004/0247722 A1 * | 12/2004 | Acklam | ............... | B29C 70/48 425/129.1 |
| 2005/0006823 A1 * | 1/2005 | Merrick | ............... | B29C 70/443 264/511 |
| 2005/0161861 A1 * | 7/2005 | Lammers | ............... | B29B 11/16 264/255 |
| 2006/0197244 A1 * | 9/2006 | Simpson | ............... | B29C 70/48 264/29.7 |
| 2006/0244165 A1 * | 11/2006 | Huang | ............... | C04B 35/522 264/29.5 |
| 2006/0249877 A1 * | 11/2006 | Kaneko | ............... | B29C 70/443 264/257 |
| 2006/0261504 A1 * | 11/2006 | Simpson | ............... | C04B 35/83 264/29.1 |
| 2007/0023975 A1 * | 2/2007 | Buckley | ............... | B29B 11/16 264/494 |
| 2008/0106007 A1 * | 5/2008 | Kipp | ............... | B29C 41/08 264/571 |
| 2010/0108246 A1 * | 5/2010 | Sanchez-Brunete Alvarez .......... B29C 70/46 156/245 |
| 2010/0291258 A1 * | 11/2010 | Dull | ............... | B29C 33/18 425/405.2 |
| 2011/0006460 A1 * | 1/2011 | Vander Wel | ............... | B29C 43/36 264/403 |
| 2011/0059201 A1 * | 3/2011 | Jong | ............... | B29C 45/7337 425/547 |
| 2011/0254193 A1 * | 10/2011 | Shui-Yuan | ............... | B29C 45/14786 264/152 |
| 2012/0132407 A1 * | 5/2012 | Makhlouf | ............... | F28D 9/0025 165/173 |
| 2012/0177927 A1 * | 7/2012 | Cheng | ............... | B29C 69/02 428/408 |
| 2012/0279649 A1 | 11/2012 | Lemckau et al. | | |
| 2013/0130583 A1 * | 5/2013 | Bjornhov | ............... | B29C 70/48 442/218 |
| 2013/0187314 A1 * | 7/2013 | Aravamudan | ............... | B29C 70/443 264/571 |
| 2013/0241100 A1 * | 9/2013 | Lownsdale | ............... | B29C 70/12 264/101 |
| 2013/0328236 A1 * | 12/2013 | Yamamoto | ............... | B29C 70/48 264/257 |
| 2014/0011918 A1 * | 1/2014 | D'Andrea | ............... | C08G 18/698 523/428 |
| 2014/0088567 A1 * | 3/2014 | Nieman | ............... | A61M 1/0084 604/533 |
| 2014/0106637 A1 * | 4/2014 | Bertucelli | ............... | C08J 5/24 442/136 |
| 2014/0123721 A1 * | 5/2014 | Ishii | ............... | B21D 22/022 72/342.4 |
| 2014/0191447 A1 * | 7/2014 | Chiu | ............... | B29C 70/48 264/571 |
| 2016/0107357 A1 * | 4/2016 | Lin | ............... | B29C 45/7337 264/403 |
| 2016/0368187 A1 * | 12/2016 | Schneebauer | ............... | B29C 70/467 |
| 2017/0001339 A1 * | 1/2017 | Boisson | ............... | B29C 70/46 |
| 2017/0050393 A1 * | 2/2017 | Duclos | ............... | B29C 43/34 |
| 2017/0114198 A1 * | 4/2017 | Tudor | ............... | C08J 5/24 |
| 2017/0203493 A1 * | 7/2017 | Marastoni | ............... | B29C 49/6427 |
| 2017/0225381 A1 * | 8/2017 | Corbett | ............... | B29C 49/24 |
| 2018/0194051 A1 * | 7/2018 | Suzuki | ............... | B29C 45/34 |

FOREIGN PATENT DOCUMENTS

| | | |
|---|---|---|
| JP | H06134787 A | 5/1994 |
| JP | H1148330 A | 2/1999 |
| WO | 2009130493 A1 | 10/2009 |

OTHER PUBLICATIONS

U.K. Search Report for application GB1504498.5 dated Sep. 18, 2015.

* cited by examiner

METHOD AND APPARATUS FOR PRODUCTION OF CARBON FIBER COMPONENTS

TECHNICAL FIELD

This invention relates to a method of production of fiber reinforced components and to apparatus for use in processes for the production of especially carbon fiber reinforced components. In particular it relates to the production of hollow carbon fiber parts for use in automobiles such as body sides.

BACKGROUND

Traditionally automobiles have been manufactured from steel, with body panels and non-structural components produced by pressing flat sheets of stock material into the required shape. Considerable amounts of energy are needed to produce steel panels, both in producing the stock sheets and in operating the heavy presses that are needed to form the panels. The resulting automobiles are also relatively heavy.

Recently there has been a drive towards reducing the weight of vehicles. One way to do this is to reduce the amount of steel used in the construction of the vehicle. Aluminium can be used instead of steel, using the same types of press and stock sheets of aluminium. This process is still relatively energy intensive.

An alternative solution is to use carbon fiber components instead of steel. A carbon fiber article, in the context of this application, refers to an article of manufacture produced at least in part using fiber reinforced polymeric composite material. Typically this will comprise a composite of carbon fiber filaments and a resin as the polymer. However, the carbon fibers may be mixed with other filaments in the composite material.

Carbon fiber reinforced composite material is known to be capable of being formed into extremely strong and lightweight components. The carbons fiber provide the strength of the material, being difficult to stretch, while the resin holds the fibers in place. Varying the direction of the fibers enables the properties of the carbon fiber product to be varied. Carbon fibers are typically woven into sheets or mats that are laid one on top of the other in a mold and then soaked in resin which is heated under pressure until it is cured to form a rigid finished composite.

The manufacture of parts in carbon fiber using traditional techniques is very time intensive and as such has mostly been limited to high value, low volume sportscar manufacture. It has found its way into more mainstream automobiles in the form of non-structural components such as bootlids or bonnets or seat parts, but again the manufacturing process has been slow making these parts expensive to produce. In particular, existing manufacturing techniques are very labor intensive and as such to produce and unsuited to high speed production line processes.

The present invention is aimed at ameliorating some of the problems of prior art carbon fiber component manufacture with the wider aim of opening up the process to mass production of parts for automobiles.

SUMMARY

According to a first aspect the invention provides method of manufacture of a carbon fiber article comprising:

providing a preform mold having a region that is shaped to compliment a shape of a preform part that is to be produced the surface being provided with at least one bore or groove that is connected to at least one conduit that passes through the mold to a manifold, (a) Laying a sheet of release material onto the surface covering at least some of the plurality of holes, (b) Applying reduced pressure to the manifold to cause the sheet to be sucked down onto the mold surface, (c) Laying carbon fiber material into the mold on top of the sheet of release material, (d) Applying an increase pressure to the manifold to push the preform free from the mold surface, and (e) removing the preform from the mold.

Steps (a) and (b) may be performed in any order, but both steps should be performed before step (c) which should be performed before step (d).

Step (c) may be performed whilst continuing to maintain a reduced pressure to the manifold so that the sheet remains sucked down onto the surface. This ensures the sheet does not move during the lay-up process.

The method may comprise a step of chilling the mold prior to applying the increased pressure.

By reduced pressure we may mean any pressure which causes the pressure at the exit of the holes in the mold to be below atmospheric pressure, and preferably a vacuum. By increased pressure we mean applying a pressure to the manifold that results in an above ambient pressure in the vicinity of the holes in the mold. For instance, a pressure of at least 2 bar may be applied, or higher at the manifold.

The increased pressure may be achieved by a step of pumping a fluid under pressure into the mold through the manifold.

The fluid may be gas or liquid. Compressed air is considered by the applicant to be a good choice when applying a positive pressure as it is safe to the user when the air exits the conduits after pushing the release sheet and preform away from the mold surface.

A chilled liquid may be fed into the mold through the manifold to cool the manifold, or a chilled gas such as liquid nitrogen. Chilled liquid is preferred as it will generally have a higher thermal capacity than a gas.

The method may comprise an additional step, after the preform has been layed up of chilling the mold to a temperature and for a sufficient length of time for the preform material to at least partially freeze. This will depend on the material used for the preform and the thickness of the lay up. It will also depend on the number, location and size of the conduits and openings in the mold surface and the material used for the mold.

The method may comprise, after the preform has been chilled and released, moving the preform into a mold where it is cured under either heat or pressure or both to form the finished molded part.

The step of moving the preform out of the mold may be performed by a robot. For instance, a vacuum attachment on a robot arm may be used that attaches to the preform from above. Because the preform is frozen or partially frozen it is rigid enough to be moved in this way and retain its shape.

To reduce the amount of time that is needed to chill the preform material to a temperature where it is relatively rigid, the method steps may be performed in a temperature controlled environment in which the temperature is below 10 degrees C., or perhaps below 5 degrees C. The mold may be prechilled prior to use, for instance to 5 degrees C. or lower. Also the preform material may be prechilled to a temperature above, but close to, that at which it freezes.

According to a second aspect the invention provide a preform assembly apparatus comprising:

a preform mold having a region that is shaped to compliment a shape of a preform part that is to be produced, the surface of the mold being provided with at least one bore or groove that is connected to at least one conduit that passes through the mold to a manifold a source of reduced pressure that is selectively connected to the manifold, and a source of increased pressure that is selectively connected to the manifold.

The at least one groove or hole in the surface may each comprise an open end of a respective bore formed into the mold that is connected by a respective or shared conduit to the manifold. The holes and/or grooves may be spaced at regular or irregular intervals over the mold surface so that the surface has the appearance of a mesh.

The holes or grooves should be small enough and that the material being pressed into the mold, or any layer of material placed between the mold surface and material being pressed into the mold, is not able to conform to the hole or groove as otherwise this would affect the surface finish of the part.

The mold may include secondary passages through which cooled fluid can be passed to chill the mold. These may be connected to a separate manifold. In this case the apparatus may include a chilling means that in use selectively chills the mold. The chilling means may comprise liquid nitrogen or another chilled liquid and means for passing the chilled liquid into the mold.

The source of reduced pressure may comprise a vacuum pump.

The apparatus may include at least one hose that connects the manifold to the source of reduced pressure, increased pressure or vacuum pump.

Also, there may be secondary passages through which a pressurized fluid can be applied. This may be the same passages through which the cooled fluid is passed or separate passages.

If the same passages are used for applying the reduced pressure and/or increase pressure and/or chilled fluid, the apparatus may include a valve which has two or three different ways and means for operating the valve to connect each source selectively to the manifold.

The apparatus may include at least one sheet of release material. This may be a non-porous vapor impermeable sheet.

The apparatus may include at least one robot that is adapted to pick the chilled preform from the mold and place into a further mold where it is cured.

There will now be described, by way of example only several embodiments of apparatus and methods for manufacture of carbon fiber components in accordance with the present invention of which:

DETAILED DESCRIPTION

Figure 1:
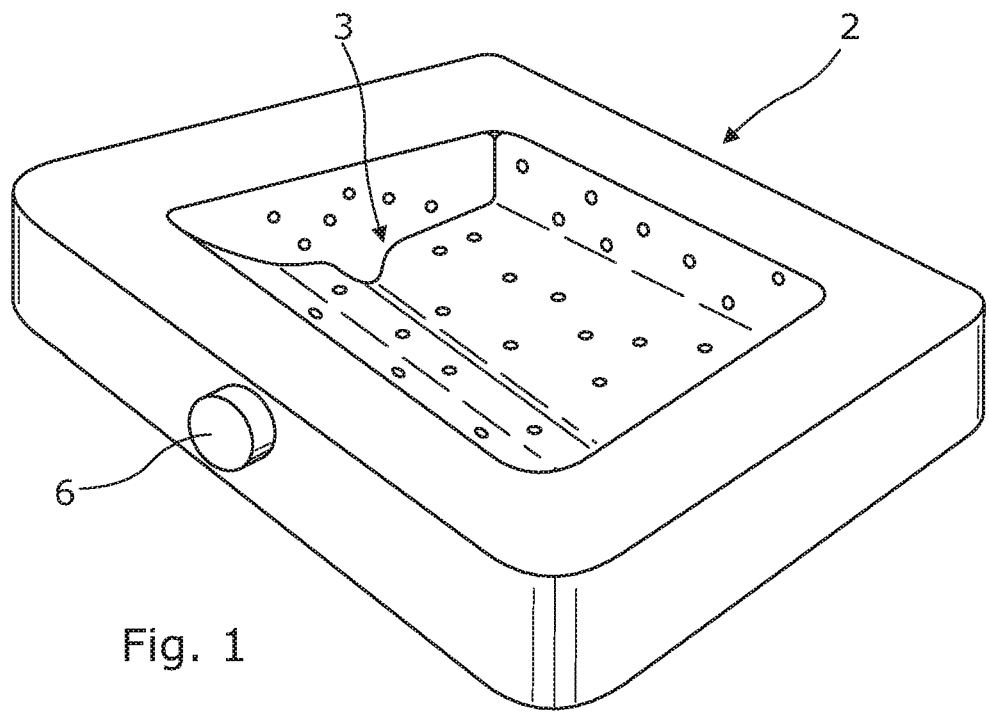
FIG. 1 shows a perspective view from above and to one side of a mold for use in a method of making a carbon fiber part according to a first embodiment of the invention.
Figure 2:
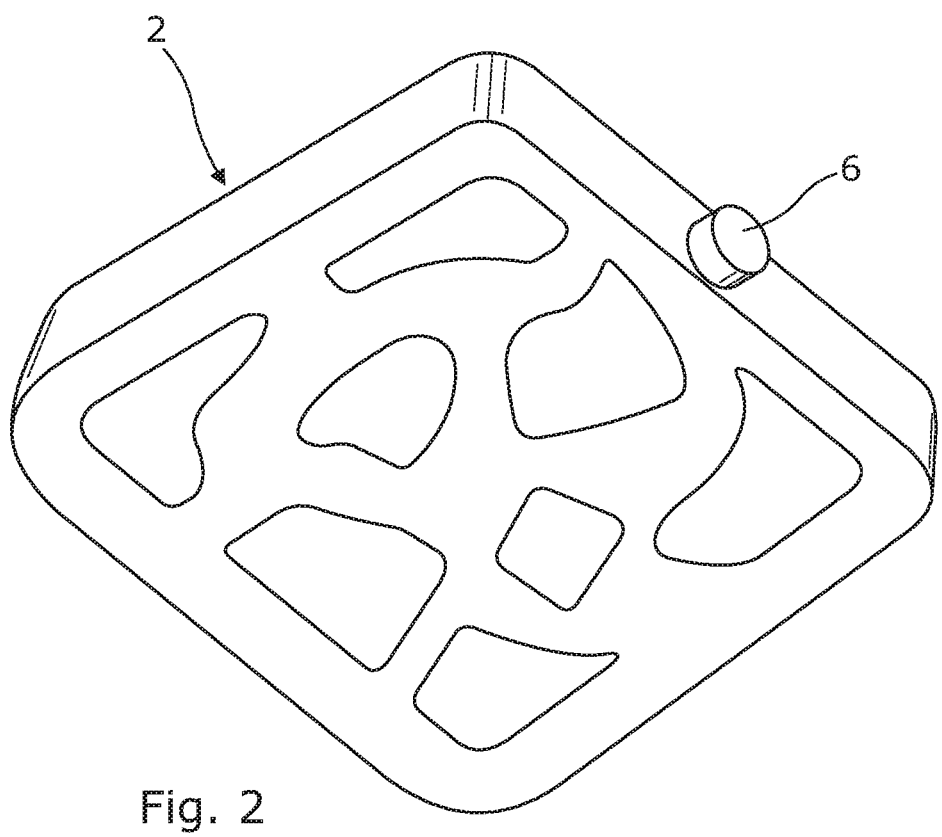
FIG. 2 shows the part in perspective view from below and to one side.
Figure 3:
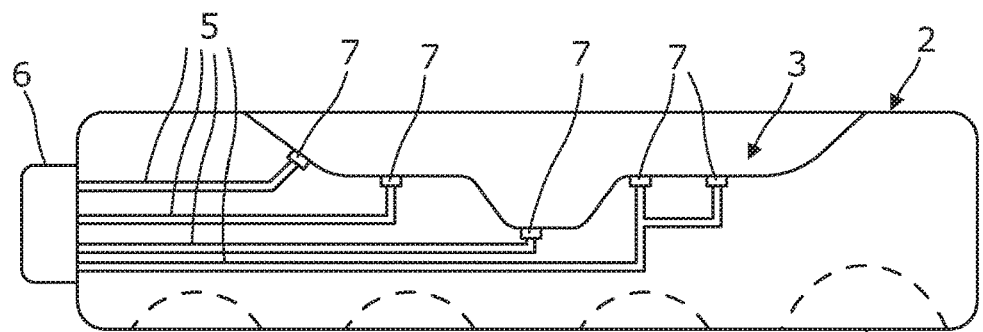
FIG. 3 shows the mold in cross section with some of the internal conduits visible.

FIGS. 1 to 3 and FIG. 10 show, in a position prior to use, an apparatus 1 of the present invention for use in making carbon fiber composite components. The apparatus 1 comprises a mold part 2 which takes the form of a shaped block of solid material. In this example the block is a metal alloy. The upper surface of the block has a cutout formed into it which is an exact negative copy of a surface of a part to be molded. The recess therefore has the shape that would result if the part was pushed down into the surface and left an imprint. The rear 4 (underside) of the mold is cut away in this example to reduce the weight and amount of material used, and reduce the thermal mass of the block, although this is not essential to the function of the mold. This can be seen in FIG. 2.

Formed into the block are multiple conduits 5, each a few mm in diameter, that extend from a manifold 6 in one side face of the block to end at respective openings 7 in the surface of the mold. These openings, each a small circular hole, are spaced evenly across the surface of the mold. Of course, other arrangements of holes and conduits could be used. The conduits are sealed to the manifold so that any fluid pumped into the mold through the manifold will exit through the holes in the upper surface of the mold.

Figure 10:
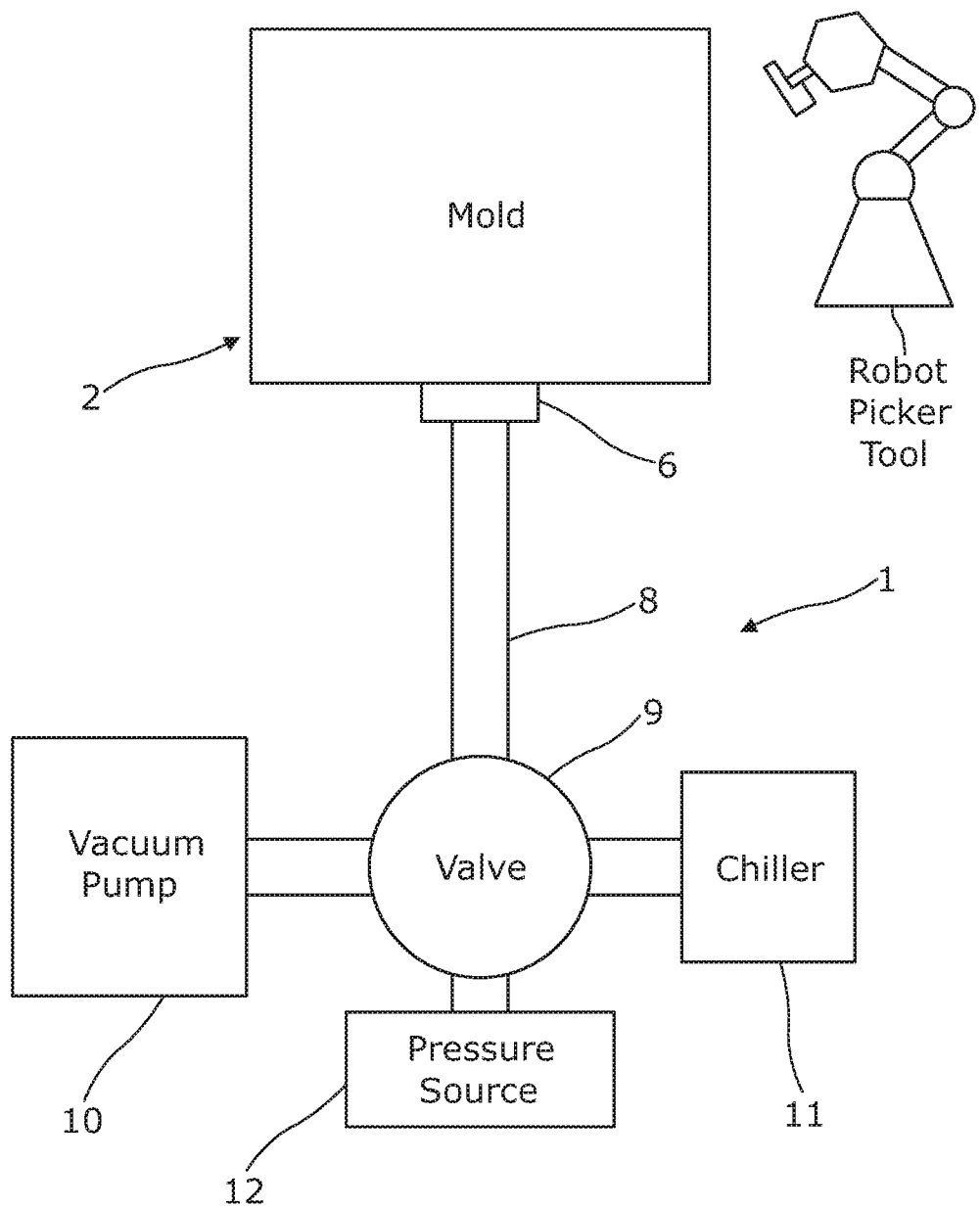
FIG. 10 shows the mold connected to other apparatus when in use.

As shown in FIG. 10, the manifold 6 is connected to a hose 8, which is in turn connected to a three way diverter valve 9. The valve 9 is in turn connected to a vacuum pump 10 when in a first position and to a source of chilled fluid 11 (in this example a pressurized bottle of liquid nitrogen) when in a second position. In a third position the manifold may be connected to a source of positive pressure 12. A handle (not shown) allows an operator to operate the valve, although this could be automated by connecting the valve to a suitable computer controlled actuator.

Figure 4:
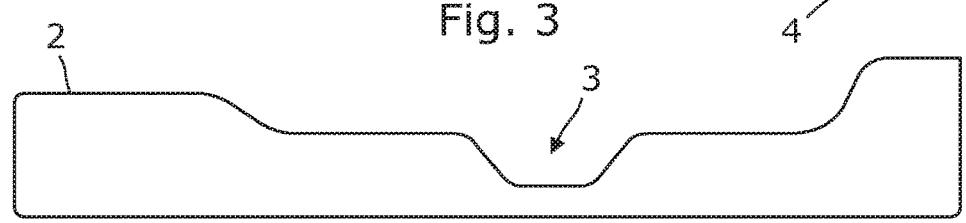
FIG. 4 is a view of the mold in cross section with the internal conduits omitted for clarity in a position prior to use.
Figure 5:
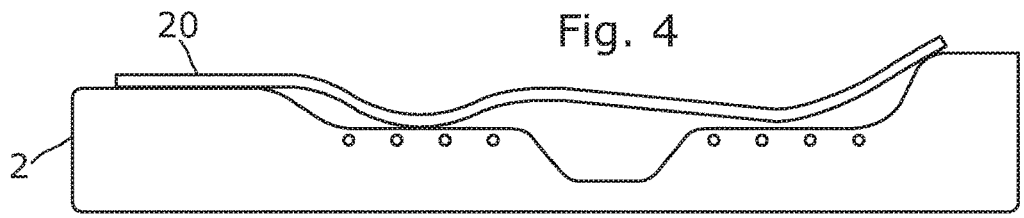
FIG. 5 shows a first step in a process of making a carbon fiber article using the mold.
Figure 6:
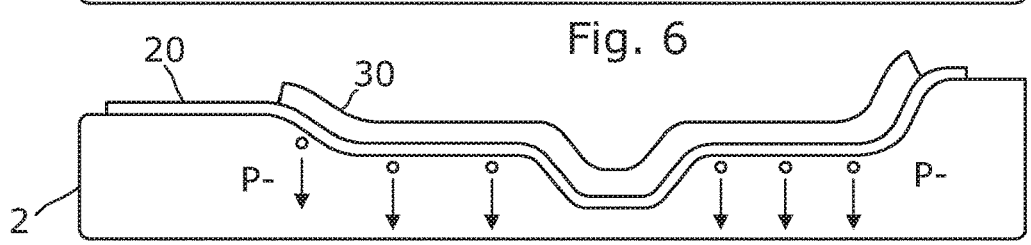
FIG. 6 shows a second step in a process of making a carbon fiber article using the mold.

To use the mold 2, it is placed on a level surface as shown in FIG. 4 in a chilled room. The operator then loosely places a sheet of release material 20 across the upper surface as shown in FIG. 5. The diverter valve 9 is then operated to apply a vacuum to the manifold 6. This in turn sucks out the air between the sheet 20 and the upper surface of the mold by sucking air out of the conduits 7 so that the release material closely follows the contours of the upper surface. This is shown in FIG. 6. The valve 9 could be opened before the sheet is placed on the surface if preferred.

Figure 7:
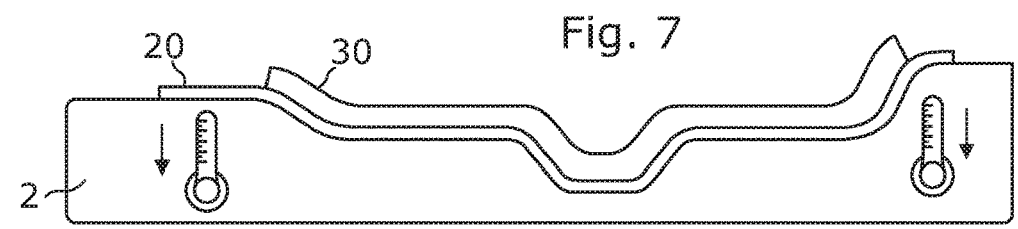
FIG. 7 shows a third step in a process of making a carbon fiber article using the mold.

In a next step, the preform material 30 is pressed into the mold onto the release sheet as shown in FIG. 7. This material will typically comprise sheets of carbon fibers or other elongate fibers along with an uncured or partially cured resin material. The resin material may be impregnated into the fibers before laying up, a so called prepreg material. Alternatively or additionally resin may be added to the fiber material during the laying up process.

Many layers may be added, depending on the properties of the finished article. A pattern would be provide for the operator to follow if the part is complex, and the fiber sheets maybe cut prior to laying up in accordance with the pattern. The orientation of the fibers in each layer will typically also be carefully controlled as part of this process.

When lay up is complete the assembly will look as shown in FIG. 7 with the material firmly pushed into place. This lay up process may be performed manually but a robot could be used to add the material. Where required, the material may be precut to the correct shape for its role in the finished article.

Figure 8:
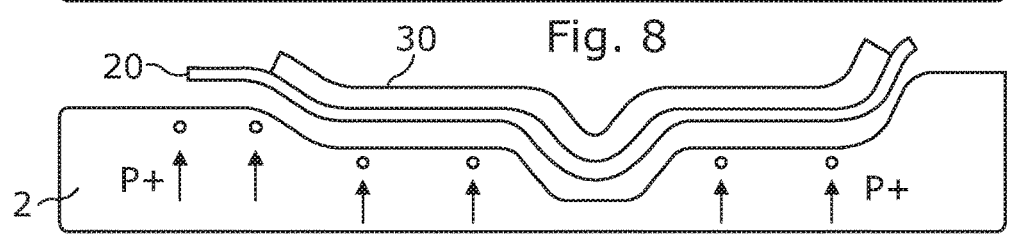
FIG. 8 shows a fourth step in a process of making a carbon fiber article using the mold.

Once the material has been layed up, the mold is then chilled by applying the liquid nitrogen to the conduits at low pressure as shown in FIG. 8. This rapidly chills the underside of the material 30, freezing it or partially freezing it. This makes the preform rigid so that it will not lose its form when removed from the mold.

Figure 9:
FIG. 9 shows a final step in a process of making a carbon fiber article using the mold.

In a final step, the pressure applied to the underside of the release sheet 20 is increased to cause it to "pop" out of the mold. This is shown in FIG. 9. The preform 30, optionally with the release sheet still in place, is then gripped by a vacuum attachment on a robot arm where it is moved across into a second mold in which it will be pressed and heated to form the final cured article. The robot and attachment are shown in FIG. 10.

The skilled person will understand that various modifications can be made within the scope of the present invention. In particular, the shape of the mold and number and position of holes or grooves can be varied depending on the product being produced. It is also envisaged that the mold could include multiple areas that are each shaped to a part to be produced, thus allowing more than one part to be layed up in the mold at any given time.

The invention claimed is:

1. A method of manufacture of a carbon fiber article comprising:
   (a) providing a preform mold having a region that is shaped to compliment a shape of a preform part that is to be produced, wherein the surface of the mold includes at least one bore or groove that is connected to at least one conduit that passes through the mold to a manifold,
   (b) laying a sheet of release material onto the surface covering the at least one bore or groove,
   (c) applying reduced pressure to the at least one bore or groove by way of the manifold to cause the sheet to be sucked down onto the mold surface,
   (d) laying carbon fiber material into the mold on top of the sheet of release material,
   (e) applying an increase pressure to the at least one bore or groove by way of the manifold to push the preform free from the mold surface,
   (f) removing the preform from the mold, and
   (g) feeding a chilled liquid into the mold through the manifold to the at least one conduit to cool the mold.

2. The method according to claim 1 wherein the step (g) of feeding the chilled liquid into the mold is carried out prior to the step (e) of applying the increased pressure.

3. The method according to claim 1 wherein the step (e) of applying the increased pressure is carried out by pumping a fluid under pressure into the mold through the manifold.

4. The method according to claim 1 further including the additional step, after the preform has been laid up, of chilling the mold to a temperature and for a sufficient length of time for the preform material to at least partially freeze.

5. The method according to claim 1 further including the step of, after the preform has been chilled and released, moving the preform into a mold where it is cured under either heat or pressure or both to form the finished molded part.

6. The method according to claim 1 wherein the step of removing the preform out of the mold is carried out by a robot.

7. The method according to claim 1 wherein at least one, or all of the steps are performed in a temperature controlled environment in which the temperature is below 5 degrees C.

* * * * *